United States Patent
Busato et al.

[11] Patent Number: 5,950,576
[45] Date of Patent: Sep. 14, 1999

[54] PROPORTIONAL COOLANT VALVE

[75] Inventors: Murray F. Busato; John Edward Cook, both of Chatham, Canada

[73] Assignee: Siemens Canada Limited, Mississauga, Canada

[21] Appl. No.: 09/107,516

[22] Filed: Jun. 30, 1998

[51] Int. Cl.[6] ....................................................... F01P 7/14
[52] U.S. Cl. .................................... 123/41.08; 137/625.46
[58] Field of Search .................... 123/41.08; 137/625.46, 137/625.41

[56] References Cited

U.S. PATENT DOCUMENTS

| | | |
|---|---|---|
| 2,089,943 | 8/1937 | Busby . |
| 2,988,108 | 6/1961 | Malmquist et al. ............... 137/625.46 |
| 3,124,162 | 3/1964 | Cameron ............................ 137/625.11 |
| 3,369,565 | 2/1968 | Haggard, Jr. ....................... 137/625.11 |
| 3,488,032 | 1/1970 | Scott ..................................... 251/172 |
| 3,590,872 | 7/1971 | Baity ................................. 137/625.46 |
| 4,178,963 | 12/1979 | Riefler et al. ....................... 137/624.18 |
| 4,195,777 | 4/1980 | Ikebukuro et al. ..................... 237/123 |
| 4,442,865 | 4/1984 | Shigeo .................................... 137/874 |
| 4,827,980 | 5/1989 | Mazzei et al. ...................... 137/625.46 |
| 5,110,045 | 5/1992 | Glasson et al. ....................... 236/93 R |
| 5,118,418 | 6/1992 | Roussel .................................. 210/278 |
| 5,190,077 | 3/1993 | Pawelzik et al. .................. 137/625.46 |
| 5,694,967 | 12/1997 | Schultz .............................. 137/118.02 |

*Primary Examiner*—Noah P. Kamen
*Assistant Examiner*—Jason Benton

[57] ABSTRACT

A rotary proportioning valve has a valve body with two inlet ports and an outlet port spaced apart about an axis. The valve body has a circular side wall and a first circular end wall closing one axial end of the side wall. Each of the ports intercepts at least the first end wall to communicate with interior space of the valve body. A shutter disposed within the interior space is supported for rotary positioning about the axis, and is operated by a shaft that extends through a second end wall that closes the opposite end of the body side wall. The shutter has a circular wall that confronts at least the first end wall. Plural fenestrations in the circular shutter wall are positioned relative to respective body ports in accordance with positioning of the shutter for proportioning flows into the inlet ports into a proportioned flow from the outlet port. A spring-loaded mechanism within the interior space of the valve body bears against the second end wall to maintain the circular shutter wall confronting the first end wall. In one embodiment, the shutter has an axial wall on the perimeter of the circular wall, the fenestrations extend into that axial wall, and the ports also extend into the side wall of the body.

16 Claims, 3 Drawing Sheets

PROPORTIONAL COOLANT VALVE

FIELD OF THE INVENTION

This invention relates generally to cooling systems of internal combustion engines that power automotive vehicles, and more particularly to a proportional coolant valve that proportions flow of liquid coolant to a radiator.

BACKGROUND OF THE INVENTION

An internal combustion engine that powers an automotive vehicle may comprise a liquid cooling system for removing waste heat from the engine. Such a cooling system may comprise a pump operated by the engine, a radiator, and a thermostat valve. As the pump circulates liquid coolant through the system, engine heat is transferred to coolant passing through engine coolant passages. When the engine has reached operating temperature, the thermostat valve opens to allow coolant to flow through the radiator where heat is transferred from the coolant to ambient air passing across exterior surfaces of the radiator. Hence, the thermostat valve functions to restrict coolant flow to the radiator until the engine has heated the coolant to a temperature corresponding to the operating temperature of the engine. This allows a cold engine to reach operating temperature more quickly. Once a thermostat valve has fully opened, the temperature of the coolant, and hence that of the engine, can fluctuate over a range of operating temperatures determined by various factors such as the size of the radiator, the rate at which the pump pumps liquid coolant through the radiator, how the engine is being operated, and ambient air temperature. Should the operating temperature fall below this range, the thermostat valve will once again restrict flow to the radiator in an effort to restore operating temperature.

Certain thermostat valves have bi-metal or wax-pellet actuators. Those valves may possess certain disadvantageous operating characteristics, including relatively slow response times and relatively wide switching hysteresis. Such characteristics endow a valve with a wider band of temperatures over which the valve may operate between closed and open positions. Hence, they may exhibit relatively loose temperature regulation.

SUMMARY OF THE INVENTION

It is believed that the inability of such thermostat valves to more closely regulate coolant, and hence engine, temperature may influence the character of the engine exhaust, and consequently impact tailpipe emissions. Hence, it is further believed that more precise temperature regulation can provide improved control over tailpipe emissions.

One aspect of the present invention relates to a rotary proportioning valve comprising a valve body having plural inlet ports and an outlet port spaced apart about an axis, the valve body comprising a circular side wall and a first circular end wall closing one axial end of the side wall, each of the ports intercepting at least the first end wall to communicate with interior space of the valve body, a shutter disposed within the interior space and supported for rotary positioning about the axis, the shutter comprising a circular wall that confronts at least the first end wall, plural fenestrations in the circular shutter wall each of which is positioned relative to a respective body port in accordance with positioning of the shutter about the axis for proportioning flows into the inlet ports into a proportioned flow from the outlet port, the body comprising a second end wall closing an opposite axial end of the body side wall, a shaft for operating the shutter disposed coaxial with the axis and passing in fluid-tight relationship through the second end wall, and a spring-loaded mechanism circumscribing the shaft within the interior space of the valve body and bearing against the second end wall to maintain the circular shutter wall confronting the first end wall.

Another aspect of the present invention relates to a rotary proportioning valve comprising a valve body having plural inlet ports and an outlet port spaced apart about an axis, the valve body comprising a circular side wall and a first circular end wall closing one axial end of the side wall, each of the ports intercepting at least the first end wall to communicate with interior space of the valve body, a shutter disposed within the interior space and supported for rotary positioning about the axis, the shutter comprising a circular wall that confronts at least the first end wall, plural fenestrations in the circular shutter wall each of which is positioned relative to a respective body port in accordance with positioning of the shutter about the axis for proportioning flows into the inlet ports into a proportioned flow from the outlet port, the body comprising a second end wall closing an opposite axial end of the body side wall, a shaft for operating the shutter disposed coaxial with the axis and passing in fluid-tight relationship through the second end wall, and in which the shutter further includes an axial wall disposed on the perimeter of the circular shutter wall and confronting the body side wall, each of the fenestrations also extends into the axial shutter wall, and each of the ports intercepts both the side wall and the first end wall of the body.

Still another aspect of the present invention relates to a proportioning valve comprising a valve body having a wall enclosing an interior space, plural inlet ports and an outlet port intercepting the wall to communicate with the interior space, a shutter disposed within the interior space and supported for positioning within the interior space, the shutter comprising a wall that confronts a portion of the valve body wall, plural fenestrations in the shutter wall which are positioned relative to the ports in accordance with positioning of the shutter within the interior space for proportioning flows into the inlet ports into a proportioned flow from the outlet port, a shaft for operating the shutter passing in fluid-tight relationship through the valve body wall, a first fenestration being associated with the outlet port, a second fenestration with one inlet port, and a third fenestration with another inlet port, the first fenestration being disposed in the shutter between the second and third fenestrations, and wherein at one limit of positioning of the shutter, the second fenestration is in maximum registration with the one inlet port and the third fenestration is in minimum registration with the second inlet port, wherein at another limit of positioning of the shutter, the second fenestration is in minimum registration with the one inlet port and the third fenestration is in maximum registration with the second inlet port, and wherein at, and between, both limits of positioning of the shutter, the first registration is in maximum registration with the outlet port.

Still another aspect of the present invention relates to a liquid coolant control circuit for a cooling system of an internal combustion engine, including a radiator and a pump, the circuit comprising a rotary proportioning valve for selectively shunting coolant flow from the radiator, the valve comprising a valve body having plural inlet ports one of which is communicated to an inlet to the radiator and another of which is communicated to an outlet from the radiator and an outlet port, the ports being spaced apart about an axis, the valve body comprising a circular side wall and a first circular end wall closing one axial end of the side wall, each of the ports intercepting at least the first end wall to communicate with interior space of the valve body, a shutter disposed within the interior space and supported for rotary positioning about the axis, the shutter comprising a circular wall that confronts at least the first end wall, plural fenestrations in the circular shutter wall each of which is positioned relative to a respective body port in accordance with positioning of the shutter about the axis for proportioning flows into the inlet ports into a proportioned flow from the outlet port, the body comprising a second end wall closing an opposite axial end of the body side wall, a shaft for operating the shutter disposed coaxial with the axis and passing in fluid-tight relationship through the second end wall, a spring-loaded mechanism circumscribing the shaft within the interior space of the valve body and bearing against the second end wall to maintain the circular shutter wall confronting the first end wall, an electric-controlled actuator operatively connected to the shaft for controlling the positioning of the shutter, and an electric controller controlling the actuator.

More detailed aspects of the invention will appear below.

BRIEF DESCRIPTION OF THE DRAWINGS

The accompanying drawings, which are incorporated herein and constitute part of this specification, include one or more presently preferred embodiments of the invention, and together with a general description given above and a detailed description given below, serve to disclose principles of the invention in accordance with a best mode contemplated for carrying out the invention.

DESCRIPTION OF THE PREFERRED EMBODIMENT

Figure 1:
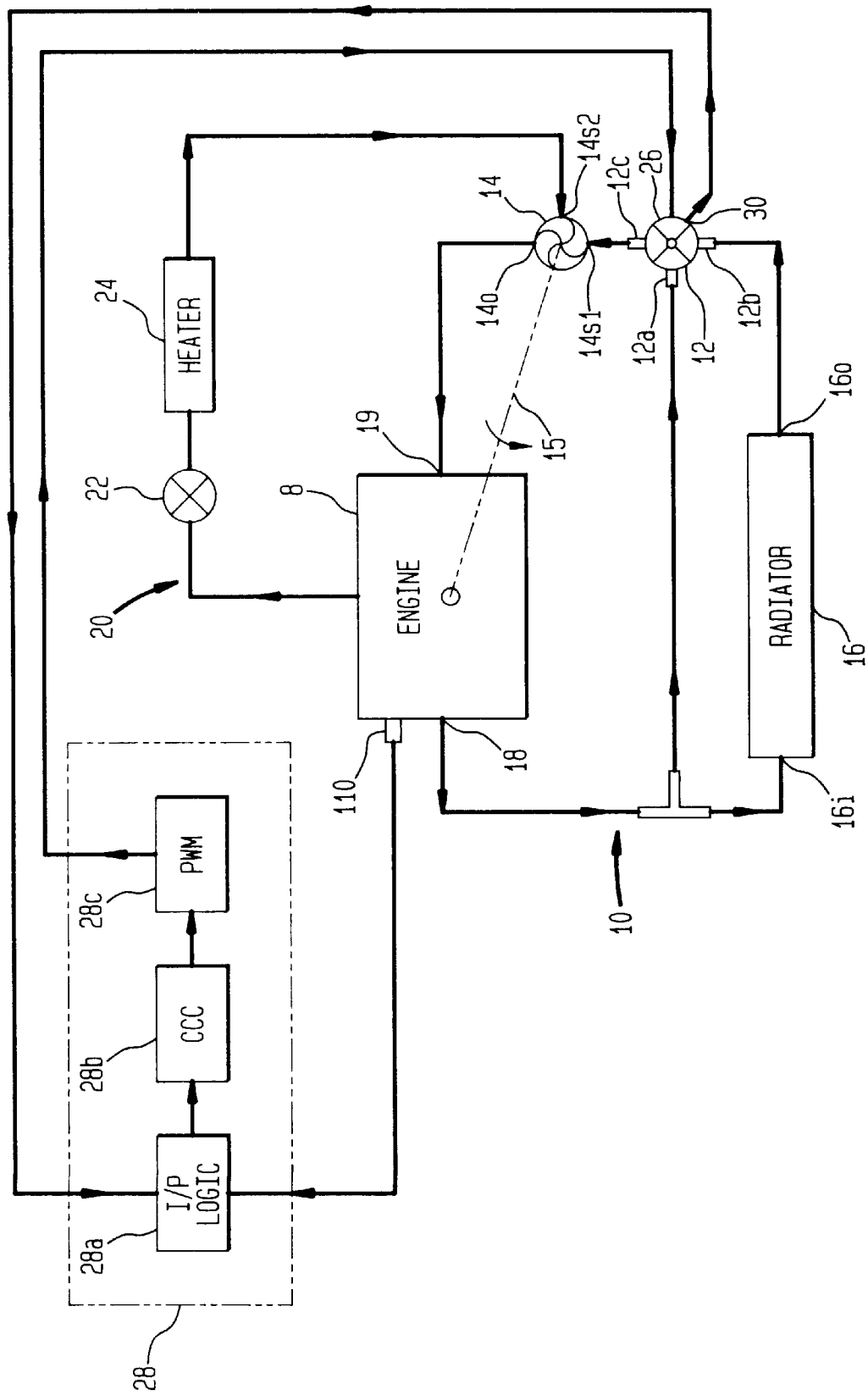
FIG. 1 is a schematic diagram of an internal combustion engine cooling system, including a proportional coolant valve, according to the present invention.

FIG. 1 schematically illustrates an internal combustion engine 8 that powers an automotive vehicle. Engine 8 has a cooling system 10, including a proportional flow coolant valve 12, according to principles of the present invention. Engine 8 comprises a cylinder block, and depending on whether the block has an I- or a V-shape, one or more cylinder heads, collectively defining engine cylinders into which fuel is introduced and then combusted to operate the engine. The combustion processes cause pistons to reciprocate within the cylinders and drive a crankshaft journaled in the block. The crankshaft delivers the engine's power output.

Liquid coolant is circulated through cooling system 10 by a pump 14 powered from the engine crankshaft to transfer heat from engine 8 to a radiator 16. A portion of cooling system 10 includes various coolant passages in the engine block and head(s) through which liquid coolant circulates, absorbing waste heat from combustion processes occurring in the engine cylinders. Radiator 16 transfers heat from the coolant flowing through it to atmosphere.

Pump 14 comprises a suction port 14s1 and an outlet port 14o, and when operated by engine 8, pump 14 draws liquid coolant into suction port 14s1 and pumps liquid coolant out of outlet port 14o. Although FIG. 1 shows pump 14 separate from engine 8, the pump may be a stand-alone pump mounted externally on the engine, or it may be integrated with the engine block. In either case, the pump may be powered from the crankshaft through any suitable drive 15, such as a belt or chain drive for example. Alternatively, pump 14 may be electric operated, such as by an electric motor for example.

Radiator 16 comprises an inlet port 16i at which engine coolant that is to be cooled enters and an outlet port 16o from which coolant that has been cooled exits. Proportional flow coolant valve 12 comprises two inlet ports 12a, 12b, and an outlet port 12c.

FIG. 1 depicts a confluence of coolant flows from various internal engine passages leaving engine 8 at a common outlet port 18. Cooling system 10 provides for flow of coolant from outlet port 18 to radiator inlet port 16i and valve inlet port 12a. The system further provides for: flow of coolant from radiator outlet port 16o to valve inlet port 12b; flow of coolant from valve outlet port 12c to pump suction port 14s1; and flow of coolant from pump outlet port 14o to a coolant inlet port 19 of engine 8 from whence coolant can flow through the internal coolant passages of engine 8 to engine outlet port 18.

Valve 12 is operable to selectively communicate outlet port 12c to inlet ports 12a, 12b. In a first operating position, valve 12 essentially unrestrictedly communicates outlet port 12c to inlet port 12a while maximally obturating inlet port 12b; in a second operating position, valve 12 essentially unrestrictedly communicates outlet port 12c to inlet port 12b while maximally obturating inlet port 12a. Hence, when pump 14 operates while valve 12 is in the second operating position, the pump will draw coolant from engine 8 essentially entirely through radiator 16; and when the pump operates while valve 12 is in the first operating position, it will draw coolant essentially entirely directly from the engine, by-passing radiator 16 in the process.

Valve 12 is also operable over a range of operating positions intermediate the first and second operating positions to proportion the relative flows entering valve 12 at its two inlet ports 12a, 12b. In this way valve 12 can control the extent to which coolant is allowed to flow through radiator 16.

FIG. 1 also shows an associated passenger compartment heater circuit 20 that contains a temperature selector valve 22 in series with a heater core 24. Valve 22 may be set either automatically or manually to present a desired restriction of coolant flow from engine 8 into heater core 24. Pump 14 has a second suction port 14s2 tapped into the suction side of pump 14, and it is to suction port 14s2 that passenger compartment heater circuit 20 is connected. Therefore, when pump 14 operates to circulate liquid coolant through cooling system 10, it will also draw liquid coolant from engine 8 through heater core 24 to the extent permitted by the setting of selector valve 22. The coolant flows entering suction ports 14s1, 14s2 entrain within pump 14 to be pumped back into engine 8 through port 19.

Valve 12 comprises an electromechanical actuator 26 that sets the valve's operating position. Actuator 26 is under the control of an electric controller 28, an engine control unit (ECU) for example, that functions to cause valve 12 to assume an operating position that proportions the relative flows entering inlet ports 12a, 12b in such a way that a desired effect is obtained. In performing this function, controller 28 may utilize an electric feedback signal from a sensor 30 associated with valve 12. The illustrated controller 28 is shown to comprise circuit stages 28a, 28b, and 28c.

Figure 2:
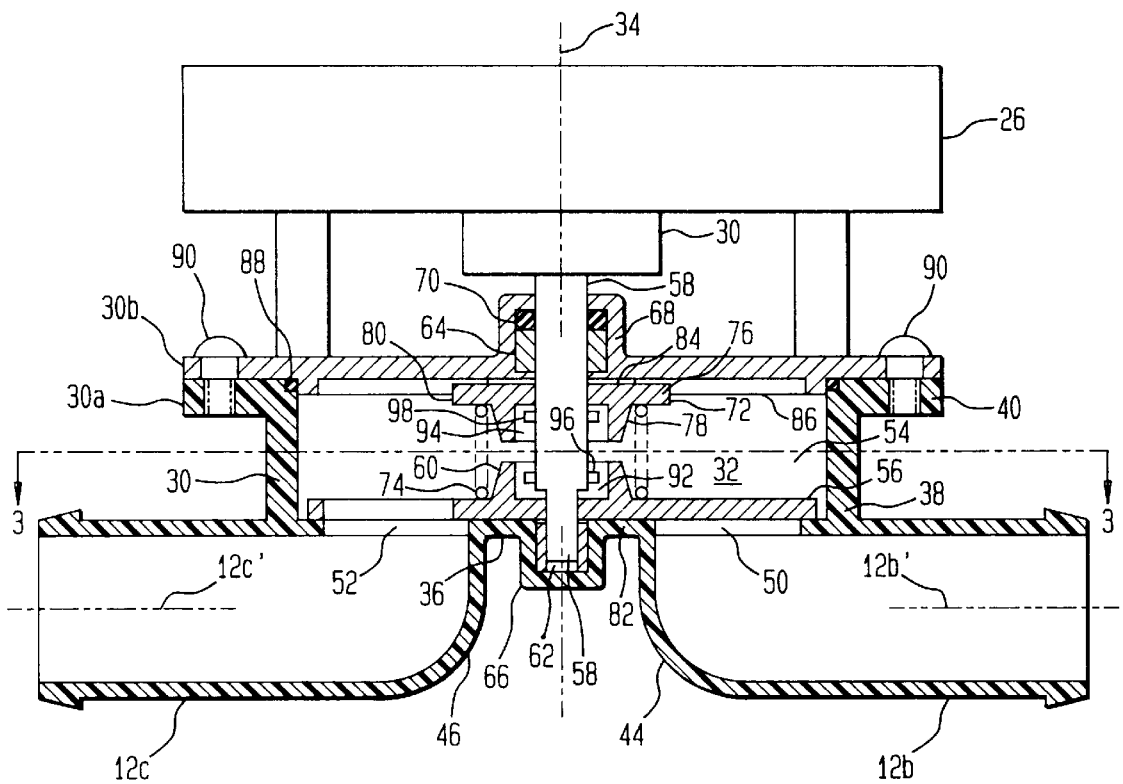
FIG. 2 is a full longitudinal cross section view through an exemplary proportional coolant valve, taken generally in the direction of arrows 2—2 in FIG. 3.
Figure 3:
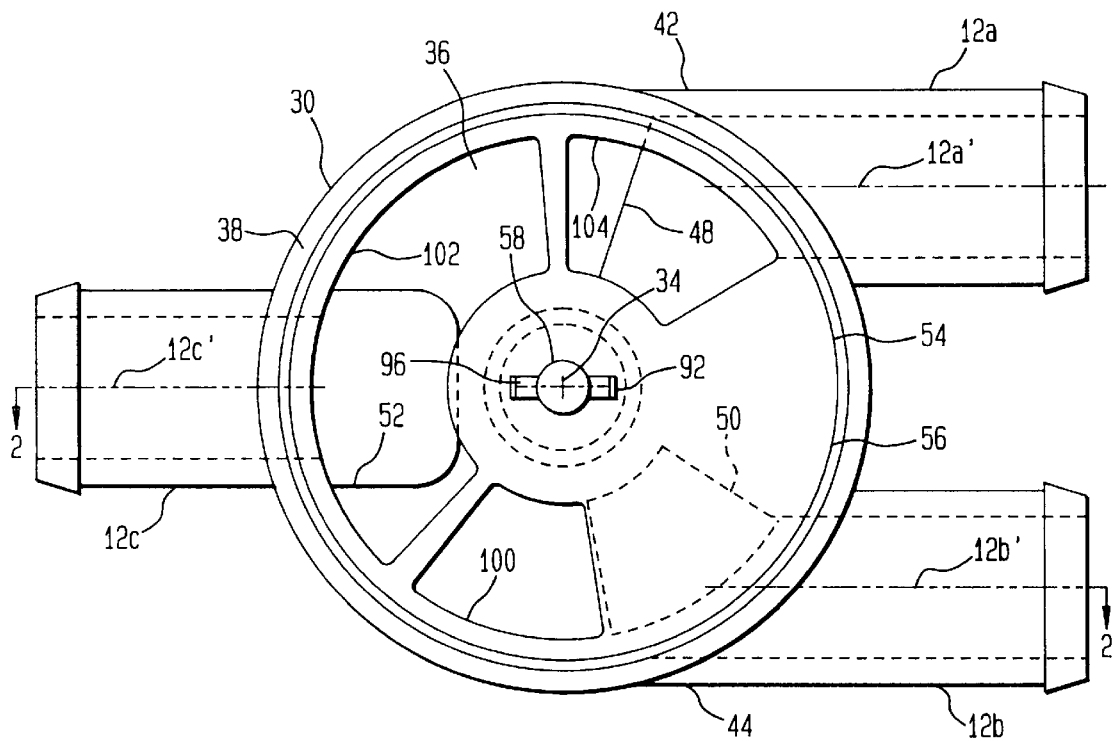
FIG. 3 is a full transverse cross section view taken generally in the direction of arrows 3—3 in FIG. 2.
Figure 4:
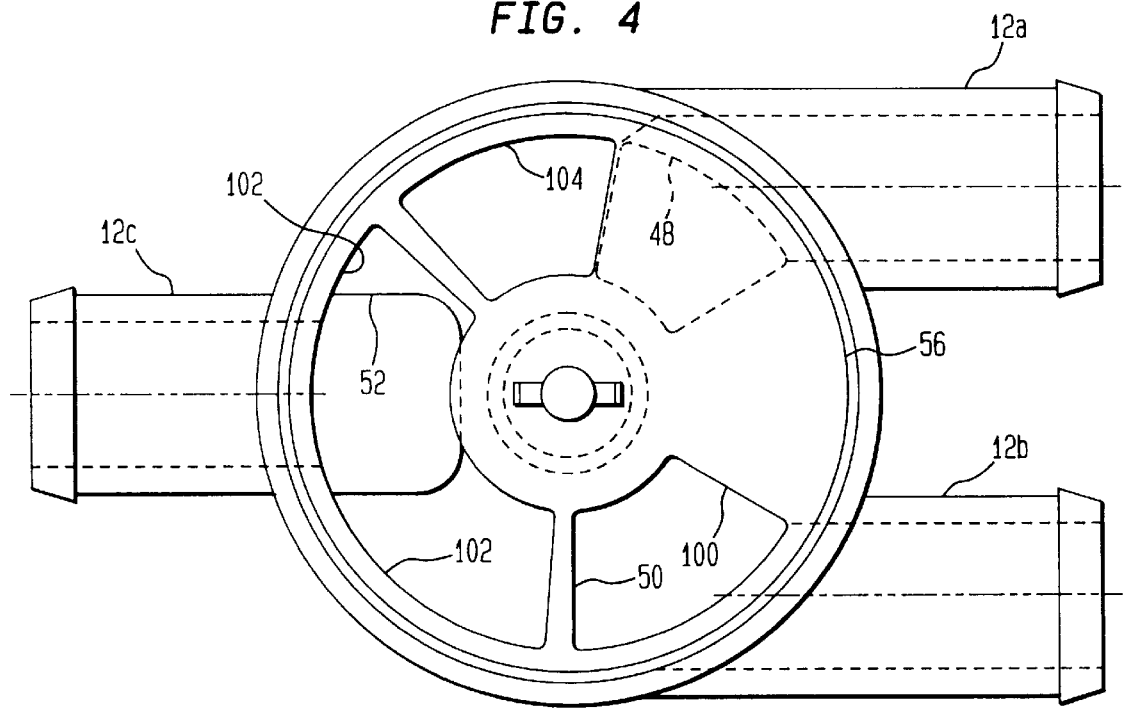
FIG. 4 is a view like FIG. 3, but showing a different operating position of the proportional coolant valve.

Detail of valve 12 is shown in FIGS. 2, 3, and 4. Valve 12 comprises a body 30, including body parts 30a, 30b. Body part 30b and a portion of body part 30a cooperatively define a walled internal cavity 32 of generally circular cylindrical shape with respect to an imaginary longitudinal axis 34 of valve 12. Inlet port 12a, inlet port 12b, and outlet port 12c are embodied as respective tubular nipples of part 30a, each having a respective axis 12a', 12b', 12c'. These three axes 12a', 12b', and 12c' are mutually parallel and lie in a common imaginary plane that is perpendicular to axis 34. Axis 12c' is the only one of the three however that is perpendicular to axis 34, and hence the nipple forming outlet port 12c may be considered to extend radial to axis 34. Axes 12a', 12b' are disposed on opposite sides of an imaginary plane that contains both axis 12c' and axis 34, and they are spaced parallel to and equidistant from that plane.

The portion of body part 30a that defines a portion of cavity 32 comprises a generally circular end wall 36 perpendicular to axis 34, and a circular annular side wall 38 that extends parallel to axis 34 from the radially outer edge of end wall 36 to a rim containing a circular radial flange 40. Each nipple forming a respective port 12a, 12b, 12c joins with end wall 36 via a respective elbow 42, 44, 46. End wall 36 contains three holes 48, 50, 52, each opening to a respective elbow 42, 44, 46. In this way each port 12a, 12b, 12c is placed in flow relationship with cavity 32.

Valve 12 further comprises a valve mechanism 54 that includes a shutter, or metering plate, 56 disposed within cavity 32. An actuator shaft 58 for operating shutter 56 is journaled on body 30 for rotation about axis 34. Shutter 56 comprises a circular disk that is essentially flat except for having at the center of one of its faces a hub 60 at which the shutter is keyed to shaft 58, enabling the two to rotate in unison. Shaft 58 is journaled on body 30 by journal bearings 62, 64 seated in respective mountings 66, 68 in end wall 36 and body part 30b respectively.

Mounting 66 is formed at the center of end wall 36 as a closed cylindrical depression. The end of shaft 58 journaled in bearing 62 does not protrude through end wall 36. Mounting 68, unlike mounting 66, is not closed, but rather contains a hole providing for egress of the opposite end of shaft 58 from cavity 32. A seal 70 is disposed within mounting 68 beyond bearing 64 relative to cavity 32 to make shaft 58 fluid-tight to the cavity wall around the hole in that mounting.

Within cavity 32, a spring-loaded mechanism 72 acts on shutter 56. Mechanism 72 comprises a helical coil compression spring 74 and a spring locator element 76. Spring locator element 76 has a generally circular annular shape. Shaft 58 passes through the center of spring locator element 76 where the two are keyed together to rotate in unison. Spring locator element 76 has a circular shoulder that seats one axial end of spring 74. This shoulder provides a generally axial surface 78 for centering that end of spring 74 on axis 34 and a generally radial surface 80 allowing the spring to bear forcefully against element 76 in the direction of axis 34. Hub 60 centers the opposite axial end of spring 74 on axis 34 and allows the spring force to be exerted axially against shutter 56.

A flat washer 82 is disposed around shaft 58 between end wall 36 and shutter 56; another flat washer 84 is disposed around the shaft between spring locator element 76 and body part 30b.

A face of body part 30b that is toward cavity 32 has a short circular ridge 86 that snugly telescopically fits within the otherwise open end of side wall 38 to thereby accurately align mountings 66, 68 and bearings 62, 64 along axis 34. Body parts 30a, 30b are fastened together to enclose cavity 32 in a sealed manner. This sealing and fastening are accomplished by a circular seal 88 disposed in a circular groove in one of the two parts 30a, 30b between flange 40 and the outer margin of part 30b and by a series of fasteners 90 holding the two parts 30a, 30b together radially outward of seal 88.

Juxtaposed portions of shutter 56 and spring locator element 76 comprise respective diametrical slots 92, 94 respectively via which the two are rotationally keyed to shaft 58. Respective pins 96, 98 protrude radially from shaft 58 to fit closely within respective diametrical slots 92, 94.

The flat outer margin of shutter 56 contains a sequence of three circumferential spaced apart apertures, or windows, 100, 102, 104 in clockwise order about axis 34 as viewed in Figures. The radial extent of each is uniform throughout, with their radially outer edges lying on a common, larger diameter imaginary circle and their radially inner edges on a common smaller diameter one. FIGS. 3 and 4 show that the most counter-clockwise window 100 has a circumferential extent of approximately 47° about axis 34, the most clockwise one 104, a circumferential extent of approximately 134°, and the intermediate window 102, a circumferential extent of approximately 55°. This leaves the imperforate region of shutter 56 between windows 104 and 100 with a circumferntial extent of approximately 112°.

FIG. 3 shows the first operating position of valve 12 and FIG. 4, the second. In the first operating position, hole 52 is in full registration with window 102, hole 48 is in full registration with window 104, and hole 50 is out of registration with window 100. In the second operating position, shutter 56 has been rotated counter-clockwise from the first operating position; hole 52 remains in full registration with window 102, however, hole 48 is now out of registration with window 104 while hole 50 is in full registration with window 100. When shutter 56 assumes positions within a range of positions between the first and second operating positions of valve 12, each hole 48, 50 has partial registration with the respective window 104, 100 while hole 52 enjoys full registration with window 102. As shutter 56 moves increasingly from the first operating position toward the second operating position, hole 50 assumes increasing registration with window 100, and hole 48, decreasing registration with window 104.

Spring-loaded mechanism 72 functions to continuously urge shutter 56 against washer 82, and the latter against end wall 36. This action serves to maintain shutter 56 in close confronting relationship to end wall 36 while minimizing frictional resistance to rotary motion. It also allows the shutter to be displaced axially to a limited extent. It is to be noticed that the keying of shutter 56 and of spring locator element 76 to shaft 58 allows for their limited axial displacement without loss of keying.

Actuator 26 comprises an electric-operated device for imparting rotary positioning to shaft 34, and hence to shutter 56, about axis 34. Examples of suitable devices are rotary linear solenoids, electric motors such as D.C. stepper motors, and linear actuators that operate the shaft through a moment arm. These devices may comprise electric windings made of copper wire. Force or torque is developed by electric current flow through the windings. Because of physical characteristics of copper, such as a positive temperature coefficient, electric current, and hence the developed force or torque, may fluctuate as environmental conditions such as the temperature change. Such fluctuations may alter the intended operating position of valve 12, introducing error into the control of coolant temperature. Controller 28 can compensate for such fluctuations, thereby attenuating their effect.

Stage 28b comprises a constant current circuit that monitors and compensates for changes in actuator winding resistance to maintain an essentially constant current output for a given input signal despite temperature change in the actuator windings. This constant current output is supplied as an input to stage 28c.

Further control utilizes position feedback from sensor 30 which senses rotary position of shaft 58 and provides to controller 28 a signal representing shaft position. Controller 28 utilizes this feedback to maintain shaft 58 in the position to which it has been commanded. This will allow valve calibration to be maintained over a range of operating temperatures that the valve is expected to encounter.

Controller 28 may also receive a signal that is correlated with both coolant and engine temperature. Such a signal may be supplied from a sensor 110. The controller may function to position valve 12 to a position that proportions coolant flow through radiator 16 so as to maintain a predetermined engine temperature. Either constant current, position feedback, or temperature control may be used collectively or independently to provide the desired parametric control for position, flow, or temperature, or any combination thereof.

The illustrated valve 12 maybe they be described as a two-port, three-way valve having two variable flow control ports (inlet ports 12a, 12b) and one non-controlled flow port (outlet port 12c). A valve embodying certain of the inventive principles may be fabricated to have more or less variable flow control ports by deleting or adding inlets or outlets in body 32 and deleting or adding appropriate windows in shutter 56. Non-controlled ports like port 12c can be added without necessarily modifying shutter 56, for example by placing them in side wall 38.

Valve 12 may be integrated with additional components, such as integrating the pump and valve in a single assembly. Such integration would eliminate the need for a separate hose associated hose clamps to connect the two. Elimination of an external hose may he reduce the likelihood of flow restriction between pump and valve. Utilizing a common body for both pump and valve could reduce part and associated installation costs.

Certain principles of the invention may be embodied in a valve that has linear, as distinguished from rotary, motion.

Figure 5:
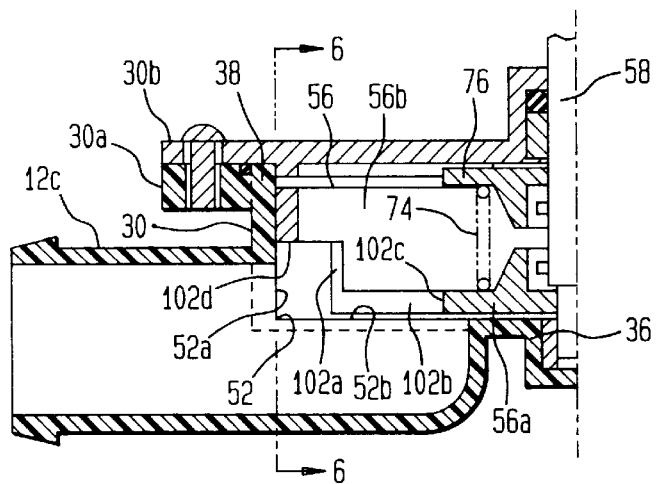
FIG. 5 is a fragmentary view similar to FIG. 2, but disclosing a modified form.
Figure 6:
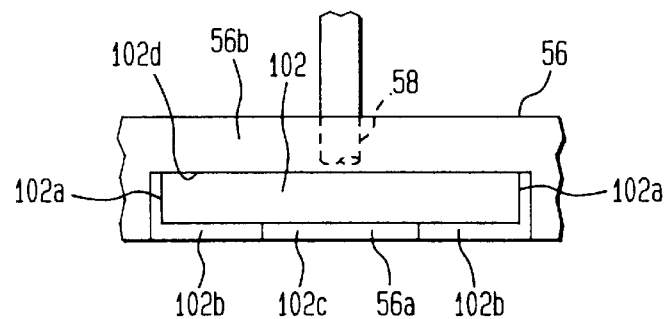
FIG. 6 is a fragmentary view in the direction of arrows 6—6 in FIG. 5, but omitting certain portions.

FIGS. 5 and 6 disclose principles of a modification to valve 12 that endow the valve with a larger controlled flow area without necessarily increasing the diameter of wall 36 or the height of wall 38 or the diameters of the nipples forming the ports. The modification is illustrated with respect to port 12c, with FIG. 5 showing that the nipple forming port 12c now intercepts portions of both walls 36 and 38. Thus, one portion of hole 52 is present in wall 36 as hole portion 52b, and another in wall 38 as hole portion 52a. The sum of the areas of hole portions 52a and 52b is greater than the area of hole 52 in the embodiment of FIGS. 2, 3, and 4.

Shutter 56 has also been modified to include an upright axial wall portion 56b standing on the perimeter of a circular bottom wall portion 56a. The latter wall portion 56a closely confronts wall 36 while the former wall portion 56b closely confronts wall 38. A fenestration, or window, 102 is present in shutter 56 for cooperation with hole 52. Fenestration 102 comprises a zone in portion 56a that is bounded circumferentially by radial edges 102b and radially inwardly by an arcuate edge 102c. The fenestration also comprises a zone in portion 56b that is bounded circumferentially by axial edges 102a and axially by an arcuate edge 102d. Each edge 102a and the adjoining edge 102b lie in a common radial plane.

The same principles are applicable to two other fenestrations (not specifically illustrated in the drawings) in shutter 56 relating to the two other nipples forming the two other ports 12a and 12b.

It is to be understood that because the invention may be practiced in various forms within the scope of the appended claims, certain specific words and phrases that may be used to describe a particular exemplary embodiment of the invention are not intended to necessarily limit the scope of the invention solely on account of such use.

What is claimed is:

1. A rotary proportioning valve comprising a valve body having plural inlet ports and an outlet port spaced apart about an axis, the valve body comprising a circular side wall and a first circular end wall closing one axial end of the side wall, each of the ports intercepting at least the first end wall to communicate with interior space of the valve body, a shutter disposed within the interior space and supported for rotary positioning about the axis, the shutter comprising a circular wall that confronts at least the first end wall, plural fenestrations in the circular shutter wall each of which is positioned relative to a respective body port in accordance with positioning of the shutter about the axis for proportioning flows into the inlet ports into a proportioned flow from the outlet port, the body comprising a second end wall closing an opposite axial end of the body side wall, a shaft for operating the shutter disposed coaxial with the axis and passing in fluid-tight relationship through the second end wall, and a spring-loaded mechanism circumscribing the shaft within the interior space of the valve body and bearing against the second end wall to maintain the circular shutter wall confronting the first end wall.

2. A rotary proportioning valve as set forth in claim 1 including an electric-controlled actuator mounted on the body and operatively connected to the shaft for controlling the positioning of the shutter.

3. A rotary proportioning valve as set forth in claim 1 in which the first end wall of the body comprises a central bearing in which an end of the shaft is journaled.

4. A rotary proportioning valve as set forth in claim 1 in which the spring-loaded mechanism comprises a helical coiled compression spring, the shutter has a hub disposed coaxial with the axis to locate an axial end of the helical coiled compression spring and to provide a rotary driving connection of the shaft to the shutter.

5. A rotary proportioning valve as set forth in claim 4 in which the spring-loaded mechanism comprises a spring locator element that locates an opposite axial end of the spring, that bears against the second end wall, end that is rotatably connected with the shaft.

6. A rotary proportioning valve as set forth in claim 1 in which spring-loaded mechanism comprises a helical coiled compression spring that is rotatably connected with the shaft.

7. A rotary proportioning valve as set forth in claim 1 in which a first fenestration is associated with the outlet port, a second fenestration with one inlet port, and a third fenestration with another inlet port, and wherein at one limit of rotary positioning of the shutter, the second fenestration is in maximum registration with the one inlet port and the third fenestration is in minimum registration with the second inlet port, wherein at another limit of rotary positioning of the shutter, the second fenestration is in minimum registration with the one inlet port and the third fenestration is in maximum registration with the second inlet port, and wherein at, and between, both limits of rotary positioning, the first registration is in maximum registration with the outlet port.

8. A rotary proportioning valve as set forth in claim 7 in which the first fenestration is disposed in the shutter circumferentially between the second and third fenestrations.

9. A rotary proportioning valve as set forth in claim 1 in which the shutter further includes an axial wall disposed on the perimeter of the circular shutter wall and confronting the body side wall, each of the fenestrations also extends into the axial shutter wall, and each of the ports intercepts both the side wall and the first end wall of the body.

10. A rotary proportioning valve comprising a valve body having plural inlet ports and an outlet port spaced apart about an axis, the valve body comprising a circular side wall and a first circular end wall closing one axial end of the side wall, each of the ports intercepting at least the first end wall to communicate with interior space of the valve body, a shutter disposed within the interior space and supported for rotary positioning about the axis, the shutter comprising a circular wall that confronts at least the first end wall, plural fenestrations in the circular shutter wall each of which is positioned relative to a respective body port in accordance with positioning of the shutter about the axis for proportioning flows into the inlet ports into a proportioned flow from the outlet port, the body comprising a second end wall closing an opposite axial end of the body side wall, a shaft for operating the shutter disposed coaxial with the axis and passing in fluid-tight relationship through the second end wall, and in which the shutter further includes an axial wall disposed on the perimeter of the circular shutter wall and confronting the body side wall, each of the fenestrations also extends into the axial shutter wall, and each of the ports intercepts both the side wall and the first end wall of the body.

11. A rotary proportioning valve as set forth in claim 10 including a spring-loaded mechanism circumscribing the shaft within the interior space of the valve body and bearing against the second end wall to maintain the circular wall of the shutter confronting the first end wall.

12. A rotary proportioning valve as set forth in claim 11 in which the first end wall of the body comprises a central bearing in which an end of the shaft is journaled, the spring-loaded mechanism comprises a helical coiled compression spring, the shutter has a hub disposed coaxial with the axis to locate an axial end of the helical coiled compression spring and to provide a rotary driving connection of the shaft to the shutter, and the spring-loaded mechanism comprises a spring locator element that locates an opposite axial end of the spring, that bears against the second end wall, and that is rotatably connected with the shaft.

13. A proportioning valve comprising a valve body having a wall enclosing an interior space, plural inlet ports and an outlet port intercepting the wall to communicate with the interior space, a shutter disposed within the interior space and supported for positioning within the interior space, the shutter comprising a wall that confronts a portion of the valve body well, plural fenestrations in the shutter wall which are positioned relative to the ports in accordance with positioning of the shutter within the interior space for proportioning flows into the inlet ports into a proportioned flow from the outlet port, a shaft for operating the shutter passing in fluid-tight relationship through the valve body wall, a first fenestration being associated with the outlet port, a second fenestration with one inlet port, and a third fenestration with another inlet port, the first fenestration being disposed in the shutter between the second and third fenestrations, and wherein at one limit of positioning of the shutter, the second fenestration is in maximum registration with the one inlet port and the third fenestration is in minimum registration with the second inlet port, wherein at another limit of positioning of the shutter, the second fenestration is in minimum registration with the one inlet port and the third fenestration is in maximum registration with the second inlet port, and wherein at, and between, both limits of positioning of the shutter, the first registration is in maximum registration with the outlet port.

14. A liquid coolant control circuit for a cooling system of an internal combustion engine, including a radiator and a pump, the circuit comprising a rotary proportioning valve for selectively shunting coolant flow from the radiator, the valve comprising a valve body having plural inlet ports one of which is communicated to an inlet to the radiator and another of which is communicated to an outlet from the radiator and an outlet port, the ports being spaced apart about an axis, the valve body comprising a circular side wall and a first circular end wall closing one axial end of the side wall, each of the ports intercepting at least the first end wall to communicate with interior space of the valve body, a shutter disposed within the interior space and supported for rotary positioning about the axis, the shutter comprising a circular wall that confronts at least the first end wall, plural fenestrations in the circular shutter wall each of which is positioned relative to a respective body port in accordance with positioning of the shutter about the axis for proportioning flows into the inlet ports into a proportioned flow from the outlet port, the body comprising a second end wall closing an opposite axial end of the body side wall, a shaft for operating the shutter disposed coaxial with the axis and passing in fluid-tight relationship through the second end wall, a spring-loaded mechanism circumscribing the shaft within the interior space of the valve body and bearing against the second end wall to maintain the circular shutter wall confronting the first end wall, an electric-controlled actuator operatively connected to the shaft for controlling the positioning of the shutter, and an electric controller controlling the actuator.

15. A liquid coolant control circuit as set forth in claim 14 in which the shutter further includes an axial wall disposed on the perimeter of the circular shutter wall and confronting the body side wall, each of the fenestrations also extends into the axial shutter wall, and each of the ports intercepts both the side wall and the first end wall of the body.

16. A liquid coolant control circuit as set forth in claim 14 in which the electric controller comprises at least one sensor sensing a parameter useful in control of the valve, and an electric circuit that utilizes the sensed parameter as a signal input in regulating the position of the shutter.

* * * * *